United States Patent
Jung et al.

(10) Patent No.: US 9,633,373 B2
(45) Date of Patent: *Apr. 25, 2017

(54) ACTIVATING DISPLAY AND PERFORMING ADDITIONAL FUNCTION IN MOBILE TERMINAL WITH ONE-TIME USER INPUT

(71) Applicant: FIRSTFACE CO., LTD., Seoul (KR)

(72) Inventors: Jae Lark Jung, Goyang-si (KR); Kyoung duck Bae, Seoul (KR)

(73) Assignee: FIRSTFACE CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/848,156

(22) Filed: Sep. 8, 2015

(65) Prior Publication Data

US 2015/0381617 A1 Dec. 31, 2015

Related U.S. Application Data

(63) Continuation of application No. 14/538,880, filed on Nov. 12, 2014, now Pat. No. 9,179,298, which is a (Continued)

(30) Foreign Application Priority Data

Oct. 19, 2011 (KR) ........................ 10-2011-0106839

(51) Int. Cl.
*H04M 1/00* (2006.01)
*G06Q 30/02* (2012.01)
(Continued)

(52) U.S. Cl.
CPC ..... *G06Q 30/0262* (2013.01); *G06F 3/04883* (2013.01); *G06F 21/32* (2013.01);
(Continued)

(58) Field of Classification Search
CPC ......... H04W 4/02; H04W 12/08; H04W 8/22; H04W 52/027; H04W 12/06; H04M 1/67;
(Continued)

(56) References Cited

U.S. PATENT DOCUMENTS 6,476,797 B1 11/2002 Kurihara et al.
6,532,298 B1 3/2003 Cambier et al.
(Continued)

FOREIGN PATENT DOCUMENTS

CN 101452365 A 6/2009
EP 1990734 A1 11/2008
(Continued)

OTHER PUBLICATIONS

International Search Report dated Mar. 20, 2013 of corresponding PCT Application PCT/KR2012/008470 (WO/2013/058533).
(Continued)

*Primary Examiner* — Charles Shedrick
(74) *Attorney, Agent, or Firm* — Knobbe Martens Olson & Bear LLP

(57) ABSTRACT

Disclosed is a mobile terminal including a touch screen display, a camera, a power button and an activation button for turning on the touch screen display. The mobile terminal has a first function and a second function to perform in response to user input and provides user settings for configuring at least one of the first and second functions such that the at least one of the first and second functions is performed along with turning on the touch screen display when pressing of the activation button is detected while the touch screen display is turned off. The mobile terminal is configured to perform the first and second functions depending upon length of pressing of the activation button in addition to turning on the touch screen display.

18 Claims, 5 Drawing Sheets

Related U.S. Application Data continuation of application No. 14/058,761, filed on Oct. 21, 2013, now Pat. No. 8,918,074, which is a continuation of application No. 13/590,483, filed on Aug. 21, 2012, now Pat. No. 8,831,557.

(51) Int. Cl.

| | | |
|---|---|---|
| *H04W 4/02* | (2009.01) | |
| *H04M 1/67* | (2006.01) | |
| *H04M 1/725* | (2006.01) | |
| *H04W 8/22* | (2009.01) | |
| *G06F 21/32* | (2013.01) | |
| *H04W 12/06* | (2009.01) | |
| *H04W 52/02* | (2009.01) | |
| *G06F 3/0488* | (2013.01) | |
| *G06K 9/00* | (2006.01) | |
| *H04L 29/06* | (2006.01) | |
| *H04W 12/08* | (2009.01) | |
| *G06F 21/36* | (2013.01) | |
| *G06F 21/62* | (2013.01) | |
| *H04W 4/22* | (2009.01) | |
| *H04W 88/02* | (2009.01) | |

(52) U.S. Cl.
CPC .............. *G06F 21/36* (2013.01); *G06F 21/62* (2013.01); *G06K 9/00006* (2013.01); *G06K 9/00087* (2013.01); *G06K 9/00221* (2013.01); *G06K 9/00597* (2013.01); *G06Q 30/0241* (2013.01); *G06Q 30/0261* (2013.01); *G06Q 30/0267* (2013.01); *G06Q 30/0269* (2013.01); *H04L 63/0861* (2013.01); *H04M 1/67* (2013.01); *H04M 1/7258* (2013.01); *H04M 1/72519* (2013.01); *H04W 4/02* (2013.01); *H04W 8/22* (2013.01); *H04W 12/06* (2013.01); *H04W 12/08* (2013.01); *H04W 52/027* (2013.01); *H04M 2250/12* (2013.01); *H04M 2250/52* (2013.01); *H04W 4/22* (2013.01); *H04W 88/02* (2013.01)

(58) Field of Classification Search
CPC ........... H04M 1/7258; H04M 2250/52; H04M 1/72519; G06F 21/32
USPC ...... 455/411, 414.1, 420, 404.2, 410; 726/1, 726/16
See application file for complete search history.

(56) References Cited

U.S. PATENT DOCUMENTS

| | | | |
|---|---|---|---|
| 6,636,732 B1 | 10/2003 | Boling et al. | |
| 7,251,478 B2 | 7/2007 | Cortegiano | |
| 7,613,446 B2 | 11/2009 | Engstrom et al. | |
| 7,623,847 B2 | 11/2009 | Yamashita et al. | |
| 7,668,829 B2 | 2/2010 | Chu et al. | |
| 7,725,511 B2 | 5/2010 | Kadi | |
| 7,738,916 B2 | 6/2010 | Fukuda | |
| 8,149,089 B2 | 4/2012 | Lin et al. | |
| 8,165,355 B2 | 4/2012 | Benkley et al. | |
| 8,265,607 B2 | 9/2012 | Wormald et al. | |
| 8,299,889 B2 | 10/2012 | Kumar et al. | |
| 8,311,514 B2* | 11/2012 | Bandyopadhyay | G06F 1/1643 455/410 |
| 8,538,370 B2 | 9/2013 | Ray et al. | |
| 8,548,206 B2 | 10/2013 | Sahin et al. | |
| 8,604,906 B1 | 12/2013 | Halferty et al. | |
| 8,627,096 B2 | 1/2014 | Azar et al. | |
| 8,643,771 B2 | 2/2014 | You | |
| 8,660,545 B1 | 2/2014 | Redford et al. | |
| 8,745,490 B2 | 6/2014 | Kim | |
| 8,782,775 B2* | 7/2014 | Fadell | G06F 21/316 726/16 |
| 8,810,367 B2 | 8/2014 | Mullins | |
| 8,811,948 B2 | 8/2014 | Bandyopadhyay et al. | |
| 8,850,365 B2 | 9/2014 | Cumming | |
| 8,912,877 B2 | 12/2014 | Ling et al. | |
| 9,082,235 B2 | 7/2015 | Lau et al. | |
| 9,229,489 B2 | 1/2016 | Toksvig et al. | |
| 9,307,396 B2 | 4/2016 | Jung et al. | |
| 9,338,274 B2 | 5/2016 | Gao et al. | |
| 2002/0083329 A1 | 6/2002 | Kiyomoto | |
| 2002/0188855 A1 | 12/2002 | Nakayama et al. | |
| 2003/0018395 A1 | 1/2003 | Crnkovich et al. | |
| 2005/0039135 A1 | 2/2005 | Othmer et al. | |
| 2005/0113071 A1 | 5/2005 | Nagata | |
| 2006/0142071 A1 | 6/2006 | Stephens | |
| 2006/0156028 A1 | 7/2006 | Aoyama et al. | |
| 2006/0258289 A1* | 11/2006 | Dua | G06F 17/30058 455/41.3 |
| 2006/0288234 A1 | 12/2006 | Azar et al. | |
| 2007/0060114 A1 | 3/2007 | Ramer et al. | |
| 2007/0100981 A1 | 5/2007 | Adamczyk et al. | |
| 2007/0136761 A1 | 6/2007 | Basmajian, II et al. | |
| 2007/0249330 A1 | 10/2007 | Cortegiano et al. | |
| 2007/0259685 A1 | 11/2007 | Engblom et al. | |
| 2007/0294725 A1 | 12/2007 | Cohen et al. | |
| 2008/0027813 A1 | 1/2008 | Kogure et al. | |
| 2008/0049980 A1 | 2/2008 | Castaneda et al. | |
| 2008/0066610 A1 | 3/2008 | Chu et al. | |
| 2008/0070622 A1 | 3/2008 | Lee | |
| 2008/0133336 A1 | 6/2008 | Altman et al. | |
| 2008/0214150 A1 | 9/2008 | Ramer et al. | |
| 2009/0012704 A1 | 1/2009 | Franco et al. | |
| 2009/0017871 A1 | 1/2009 | Brieskorn | |
| 2009/0083850 A1 | 3/2009 | Fadell et al. | |
| 2009/0239591 A1 | 9/2009 | Alameh et al. | |
| 2009/0258667 A1 | 10/2009 | Suzuki et al. | |
| 2010/0020020 A1 | 1/2010 | Chen | |
| 2010/0079380 A1 | 4/2010 | Nurmi | |
| 2010/0079508 A1 | 4/2010 | Hodge et al. | |
| 2010/0102939 A1* | 4/2010 | Stewart | G10H 1/34 340/384.1 |
| 2010/0159898 A1* | 6/2010 | Krzyzanowski | G06F 9/4445 455/414.1 |
| 2010/0159995 A1 | 6/2010 | Stallings et al. | |
| 2010/0257490 A1 | 10/2010 | Lyon et al. | |
| 2010/0304731 A1* | 12/2010 | Bratton | H04N 5/232 455/420 |
| 2010/0312643 A1 | 12/2010 | Gil | |
| 2011/0004678 A1 | 1/2011 | Rothrock | |
| 2011/0069940 A1 | 3/2011 | Shimy et al. | |
| 2011/0080260 A1 | 4/2011 | Wang et al. | |
| 2011/0081889 A1 | 4/2011 | Gao et al. | |
| 2012/0009896 A1* | 1/2012 | Bandyopadhyay | G06F 1/1643 455/411 |
| 2012/0052836 A1* | 3/2012 | Buratti | H04M 1/72541 455/404.2 |
| 2012/0069042 A1 | 3/2012 | Ogita et al. | |
| 2012/0098639 A1 | 4/2012 | Ijas | |
| 2012/0133484 A1 | 5/2012 | Griffin | |
| 2012/0146898 A1 | 6/2012 | Lin | |
| 2012/0235790 A1 | 9/2012 | Zhao et al. | |
| 2012/0302200 A1 | 11/2012 | Esbensen | |
| 2012/0303476 A1 | 11/2012 | Krzyzanowski et al. | |
| 2013/0031619 A1 | 1/2013 | Waltermann et al. | |
| 2013/0057385 A1 | 3/2013 | Murakami et al. | |
| 2013/0063611 A1 | 3/2013 | Papakipos et al. | |
| 2013/0069764 A1 | 3/2013 | Wu | |
| 2013/0082974 A1 | 4/2013 | Kerr et al. | |
| 2013/0102273 A1 | 4/2013 | Jung et al. | |
| 2013/0102363 A1 | 4/2013 | Jung et al. | |
| 2013/0104187 A1* | 4/2013 | Weidner | G06F 21/31 726/1 |
| 2013/0157561 A1 | 6/2013 | Tamai et al. | |
| 2014/0162598 A1* | 6/2014 | Villa-Real | H04M 1/66 455/411 |

(56) References Cited

U.S. PATENT DOCUMENTS

| | | |
|---|---|---|
| 2015/0051913 A1 | 2/2015 | Choi |
| 2015/0133086 A1 | 5/2015 | Pratt et al. |

FOREIGN PATENT DOCUMENTS

| | | |
|---|---|---|
| EP | 2076000 A2 | 7/2009 |
| EP | 2 288 126 A1 | 2/2011 |
| EP | 2770643 A2 | 8/2014 |
| JP | H11-328362 A | 11/1999 |
| JP | 2002-24712 A | 1/2002 |
| JP | 2003-143290 A | 5/2003 |
| JP | 2004-80080 A | 3/2004 |
| JP | 2007-179343 A | 7/2007 |
| JP | 2009-212558 A | 9/2009 |
| KR | 10-1998-085647 A | 12/1998 |
| KR | 10-2001-0026243 A | 4/2001 |
| KR | 10-2005-0079475 A | 8/2005 |
| KR | 10-2006-0033664 A | 4/2006 |
| KR | 10-2007-0076317 A | 7/2007 |
| KR | 10-2008-0086757 A | 9/2008 |
| KR | 10-2010-0027855 A | 3/2010 |
| KR | 10-2010-0049986 A | 5/2010 |
| KR | 10-2010-0057461 A | 5/2010 |
| KR | 10-2013-0104682 A | 9/2013 |
| WO | 2007/033358 A2 | 3/2007 |
| WO | 2008/081420 A2 | 7/2008 |
| WO | 2010/126504 A1 | 11/2010 |
| WO | 2013/060940 A2 | 5/2013 |
| WO | 2013/177173 A1 | 11/2013 |
| WO | 2014/022347 A1 | 2/2014 |

OTHER PUBLICATIONS

EP Search Report of corresponding European Patent Application No. 20120842666.

Think Vantage Fingerprint Software, International Business Machines Corporation, First Edition, Nov. 2005 "http: download.lenovo.com/ibmdl/pub/pc/pccbbs/thinkvantage_en/tfs56ug_en.pdf".

Concept iPhone 5 with Fingerprint Scanner "http:gadgetsin.com/concept-iphone-5-with-fingerprint-scanner.htm".

Acer Tempo M900 "http://www.theregister.co.uk/2009/07/15review_phone_acer_tempo_m900/".

iPhone User Guide (For iOS 4.2 and 4.3 Software) (Apple Inc.) Mar. 9, 2011 Chapter 1.

European Search Report dated Mar. 10, 2016 of corresponding European Patent Application No. 15195436.9 in 11 pages.

Dietz, "AuthenTec Unveils the World's Smallest Navigation and Fingerprint Matching Device for Mobile Phones", Business Wire, 2010—2 pages.

Pocovnicu, "Biometric Security for Cell Phones", Informatica Economică, 2009, vol. 13, No. 1, pp. 57-63.

Malykhina, "Fujitsu Adds Mobile Phone With Fingerprint Sensor", InformationWeek, retrieved from http://www.informationweek.com/fujitsu-adds-mobile-phone-with-fingerprint-sensor/d/d-id/1064540? on Oct. 12, 2016.

"LG Unveils Impressive Line of Smart, Feature-Rich Products at International CES 2010", PR Newswire, retrieved from http://www.prnewswire.com/news-releases/lg-unveils-impressive-line-of-smart-feature-rich-products-at-international-ces-2010-80803492.html on Oct. 12, 2016.

Angulo et al., "Exploring Touch-Screen Biometrics for User Identification on Smart Phones", Privacy and Identity 2011, pp. 130-143.

Yuan et al., "User Authentication on Mobile Devices with Dynamical Selection of Biometric Techniques for Optimal Performance", Presentation Material of International Conference on Robotics and Biomimetics, 2010, pp. 333-338.

"Motorola Atrix 4G review", engadget, retrieved from https://www.engadget.com/motorola/atrix-4g-review/ on Nov. 1, 2016.

Office Action dated Oct. 20, 2016 of corresponding Japanese Patent Application No. 2014-536982 and its English translation—8 pages.

Office Action dated Sep. 26, 2016 of corresponding Japanese Patent Application No. 2014-147884 and its English translation—7 pages.

"iPhone 4 Perfect Guide mini", Ascii Mediaworks K.K., Aug. 29, 2010, pp. 6-10, 12, 21, 23, 36, 44, 45, 55, 107, 110.

First Office Action dated Oct. 8, 2016 of corresponding Chinese Patent Application No. 201410377402.3—15 pages.

* cited by examiner

ACTIVATING DISPLAY AND PERFORMING ADDITIONAL FUNCTION IN MOBILE TERMINAL WITH ONE-TIME USER INPUT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosure relates to a method and mobile communication terminal for performing a specific function when a mobile communication terminal is activated, and more particularly to a method and mobile communication terminal for performing various functions according to the number of presses or a press time of a button for switching from an inactive state to an active state.

Description of the Related Art

Recently, various terminals, for example, such as smart phones, mobile phones, personal digital assistants (PDAs), and web pads, having not only communication functions but also various other functions have come into wide use. These terminals have rapidly been generalized because not only can an environment identical or similar to a desktop computer be implemented anytime and anywhere on the above-described terminals, but they also include a telephone function.

At present, in order to operate a corresponding function among various functions included in a terminal such as those described above, a certain operation should be performed in a state in which the terminal is in an active state, that is in a state in which a display is turned on. In addition, in order to add a certain function, an interface or button for performing the function should be added to the terminal. For example, it is possible to transmit a rescue signal indicating an emergency or urgent situation by pressing an emergency button only when the emergency button for the urgent situation is separately added.

On the other hand, users of the terminals described above perform operations of habitually taking out and activating the terminals on the move or in a standby state while carrying the terminals.

SUMMARY

According to an embodiment, there is provided a mobile communication terminal comprising: a display unit including a touch screen capable of receiving user's input through the touch screen for controlling the mobile communication terminal; a memory unit; a communication unit and an activation sensing unit, wherein the activation sensing unit detects a change from an inactive state of the mobile communication terminal to an active state of the mobile communication terminal, wherein the inactive state is defined that the display unit being turned off while the mobile communication terminal being communicable and the active state is defined that the display unit being turned on while the mobile communication terminal being communicable, wherein the mobile communication terminal performs a predetermined operation by an application of the mobile communication terminal when the activation sensing unit detects the change from the inactive state to the active state.

According to an another embodiment, there is provided a method for performing a specific function when a mobile communication terminal is activated, the method comprising: sensing a change from an inactive state of the mobile communication terminal to an active state of the mobile communication terminal, wherein the inactive state is defined that a display unit being turned off while the mobile communication termini being communicable, wherein the active state is defined that a display unit being turned on while the mobile communication terminal being communicable; and performing a predetermined operation by an application of the mobile communication terminal when the mobile communication terminal changes from the inactive state to the active state.

BRIEF DESCRIPTION OF THE DRAWINGS

Embodiments are described in further detail below with reference to the accompanying drawings. It should be understood that various aspects of the drawings may have been exaggerated for clarity.

DETAILED DESCRIPTION

Figure 1:
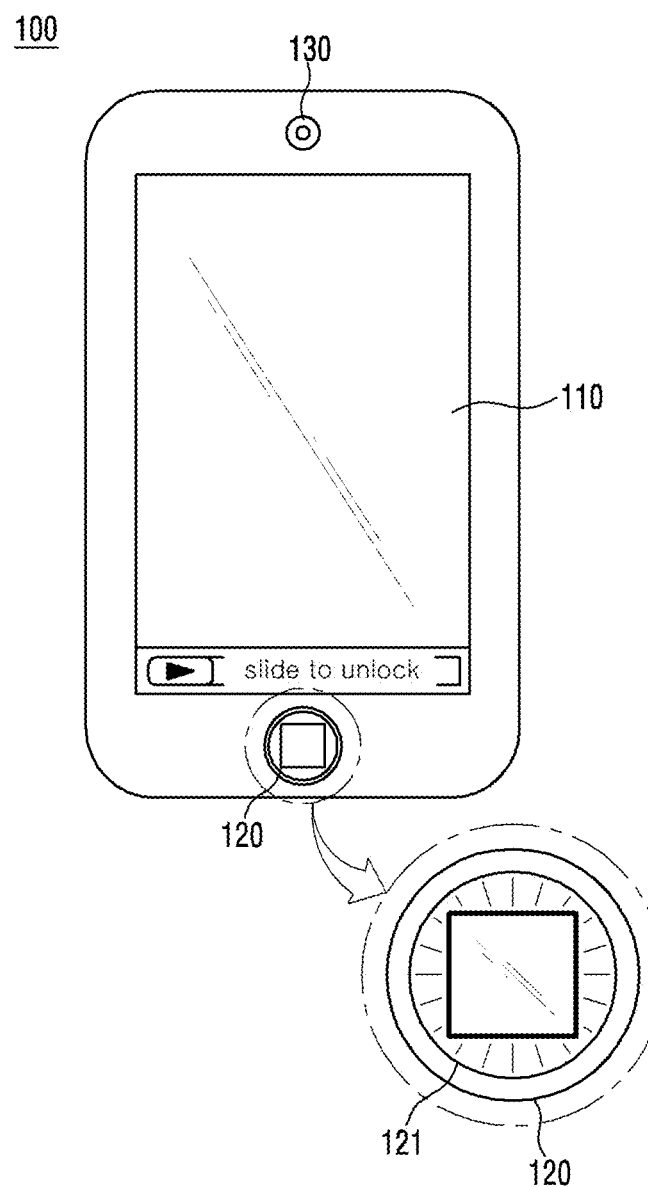
FIG. 1 is a diagram illustrating an external appearance of a mobile communication terminal according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the present invention. Also, it is to be understood that the positions or arrangements of individual elements in the embodiment may be changed without separating the spirit and scope of the present invention. The following detailed description is, therefore, not to be taken in a limiting sense, and the scope of the present invention is defined only by the appended claims that should be appropriately interpreted along with the full range of equivalents to which the claims are entitled. In the drawings, like reference numerals identify like or similar elements or functions through the several views.

Hereinafter, embodiments of the present invention will be explained in detail with reference to the accompanying drawing so that those skilled in the art can easily practice the invention.

TERMS

The term "mobile communication terminal" used herein refers to a digital device that includes a memory means and a microprocessor with computing capability as in a mobile phone, a navigation system, a web pad, a PDA, a workstation, a personal computer (for example, a notebook computer or the like) as a digital device including wired/wireless communication functions or other functions. Although an example of the mobile communication terminal (for example, a mobile phone) will be described in part of this specification, the present invention is not limited thereto.

The term "inactive state" used herein refers to a state in which the mobile communication terminal is communicable but a display screen is turned off. Even when the display screen is turned off, a predetermined function (for example, a music play function or the like) is operable. As described above, the term "inactive state" used herein refers to a concept encompassing states in which the display screen is turned off, regardless of whether or not the mobile communication terminal performs a predetermined operation. However, a state in which the mobile communication terminal is completely turned off is excluded.

The term "active state" used herein refers to a state in which the display screen of the mobile communication terminal is turned on. Switching from the "inactive state" to the "active state" refers to switching of the display screen from the OFF state to the ON state, regardless of information displayed on the display screen in the ON state. For example, the mobile communication terminal can be determined to be in the "active state" even when only a lock screen is displayed.

Mobile Communication Terminal

FIG. 1 is a diagram illustrating an external appearance of the mobile communication terminal according to an embodiment of the present invention.

Referring to FIG. 1, the mobile communication terminal 100 according to this embodiment can include a display unit 110 and an activation button 120. The mobile communication terminal 100 can further include a camera 130.

Although the display unit 110 is provided on the front side of a frame constituting the mobile communication terminal 100, the activation button 120 is provided on a lower part of the display unit 110, and the camera 130 is provided on an upper part of the display unit 110 as illustrated in FIG. 1, other forms may be configured. For example, the display unit 110 need not necessarily be formed on the entire surface of the mobile communication terminal 100. That is, the display unit 110 is only required to be formed on at least part of the mobile communication terminal 100, and the activation button 120 is only required to be formed on a part different from that of the display unit 110. In addition, the camera 130 can be formed on the other side on which the display unit 110 is not provided in the mobile communication terminal 100.

The display unit 110 displays various information regarding operation states of the mobile communication terminal 100, and also displays an interface for a user's input if the mobile communication terminal 100 drives a touch screen.

In general, if a state in which the user's operation on the mobile communication terminal 100 is absent continues for a predetermined period of time, the mobile communication terminal 100 is in the inactive state. The user's operation refers to an input through the interface displayed on the display unit 110, an operation through the button 120, or an operation through a function key (for example, a volume control key or the like). A condition in which the inactive state is reached can be set by the user. For example, the condition can be set using a setting menu through the interface displayed on the display unit 110. On the other hand, the state can be switched to the inactive state by pressing another button (for example, an ON/OFF button) provided on the mobile communication terminal 100. For example, the mobile communication terminal 100 can be completely turned off if the ON/OFF button is pressed for a long time when the mobile communication terminal 100 is in the active state, but the mobile communication terminal 100 can be in the inactive state as a communicable state in which a phone call can be received if the ON/OFF button is pressed for a short time.

The activation button 120 is means for switching the mobile communication terminal 100 from the inactive state to the active state. That is, if the user presses the activation button 120 when the mobile communication terminal 100 is in the inactive state, switching to the active state is performed. FIG. 1 illustrates a state in which a lock screen is displayed on the display unit 110 after pressing the activation button 120 when the mobile communication terminal 100 is in the inactive state. However, the activation button 120 can function as means for another operation (for example, means for moving to a standby screen while a certain operation state is displayed on the display unit 110 or means for displaying a list of programs currently being operated).

According to an embodiment of the present invention, if the user presses the activation button 120 when the mobile communication terminal 100 is in the inactive state, the mobile communication terminal 100 performs a predetermined operation in addition to switching to the active state. For example, image information is displayed on a lock screen of the display unit 110 when the predetermined operation is being performed. The image information is displayed on a lock screen of the display unit when the predetermined operation is being performed. The lock screen is configured to be displayed when the mobile communication terminal 100 changes from the inactive state to the active state. The display unit 110 can provide an unlock means on a part of the display unit 110 when the predetermined operation is being performed.

When the mobile communication terminal 100 is in the inactive state, the user can set an operation to be performed by pressing the activation button 120. For example, an operation of the mobile communication terminal 100 connected to the activation button 120 can be set using a setting menu through the interface displayed on the display unit 110. In addition, according to an embodiment of the present invention, an operation which differs according to the number of presses or a press time of the activation button 120 can be performed when the mobile communication terminal 100 is in the inactive state. For example, a first operation can be set to be performed if the activation button 120 is pressed once, and a second operation can be set to be performed if the activation button 120 is continuously pressed three times. In addition, as another example, the first operation can be set to be performed if the activation button 120 is pressed once for a short time, and the second operation can be set to be performed if the activation button 120 is pressed once for a long time. The mobile communication terminal 120 can include a predetermined clock circuit or timer to calculate the cumulative number of continuous presses of the activation button 120 and measure a period of time for which the activation button 120 is pressed. For example, the number of presses is determined to be two if the activation button 120 is re-pressed within a threshold time after one press. If the activation button 120 is pressed for the threshold time or more, a long press of the activation button 120 can be determined. Operations capable of being performed by pressing the activation button 120 in the inactive state will be described later.

According to an embodiment of the present invention, a sub-display unit 121 can be provided on the activation button 120. Information regarding an operation to be performed by pressing the activation button 120 can be displayed on the sub-display unit 121. Various types such as a shape, a character, a graphic, and color can be displayed. When the display type is the shape, a circle, a triangle, a rectangle, a hexagon, or the like can be displayed. For example, the circle can be displayed on the sub-display unit 121 when the first operation is set to be performed by pressing the activation button 120, and the triangle can be displayed on the sub-display unit 121 when the second operation is set to be performed by pressing the activation button 120, and vice versa. A display type of the sub-display unit 121 and a correspondence relationship between operations and displays can also be set by the user. For example, the user can select the first operation as the operation to be performed by pressing the activation button 120 from a setting menu and select the triangle as the display type of the sub-display unit 121 of the activation button 120. Accordingly, the user can recognize that the first operation is performed when the user has pressed the activation button 120 because the triangle is displayed on the sub-display unit 121 even when the mobile communication terminal 100 is in the inactive state.

Although the sub-display unit 121 can be implemented by a general display such as liquid crystal, a liquid crystal display (LCD), or a light emitting diode (LED), the present invention is not limited thereto.

An operation of controlling driving of the display unit 110 and the sub-display unit 121 can be performed in the same processor and the same method or in different processors and different methods.

Hereinafter, various embodiments for operations of the mobile communication terminal 100 capable of being performed by pressing the activation button 120 will be described.

Operations through Activation Button

Operations to be described below can be performed by pressing the activation button 120 when the mobile communication terminal 100 is in the inactive state, and set by the user. The operations described below are only examples. Of course, other operations can be performed by pressing the activation button 120.

1. Camera Activation Function

When the mobile communication terminal 100 is in the inactive state, the camera 130 provided in the mobile communication terminal 100 can be activated by pressing the activation button 120, and a screen currently imaged by the camera 130 can be displayed on the display unit 110.

Figure 2:
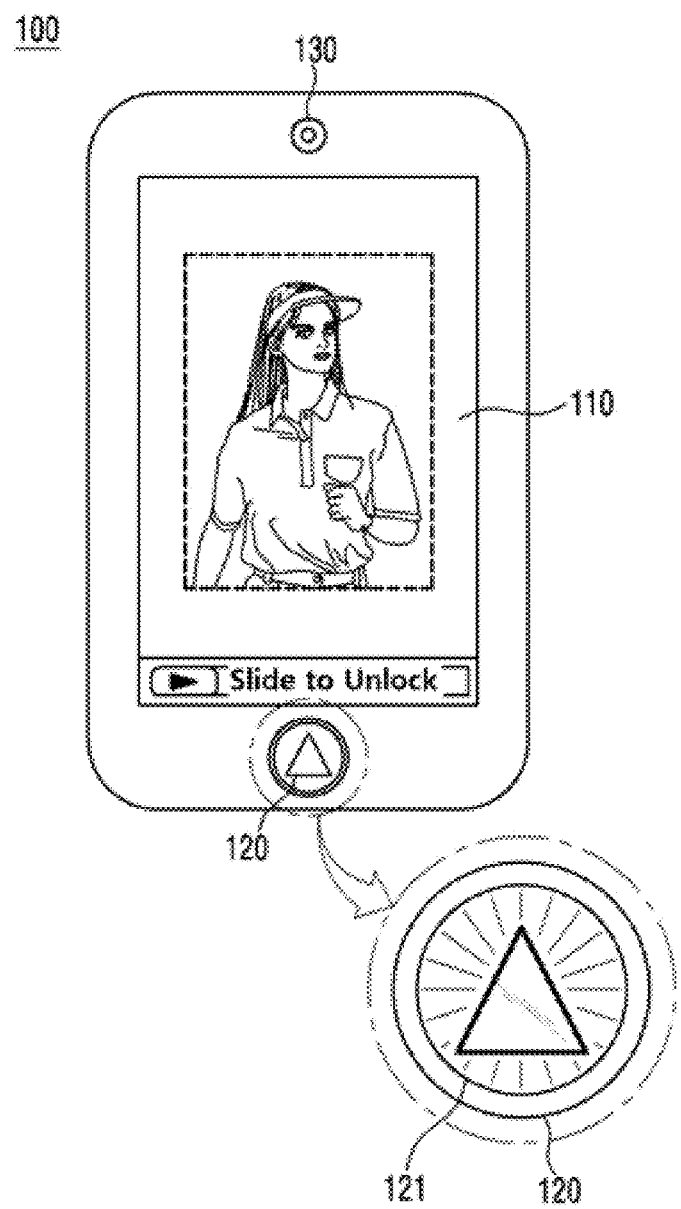
FIG. 2 is a diagram illustrating an example of an operation of the mobile communication terminal when an activation button has been pressed according to an embodiment of the present invention.

FIG. 2 is a diagram illustrating an example in which the camera 130 is activated after the activation button 120 is pressed and an imaged scene is displayed on the display unit 110.

2. Health Sensing and Health Information Transmission Functions

When the mobile communication terminal 100 is in the inactive state, the health sensing function can be driven, so that sensed health information can be transmitted to a medical authority such as a doctor or a protector.

Figure 3A:
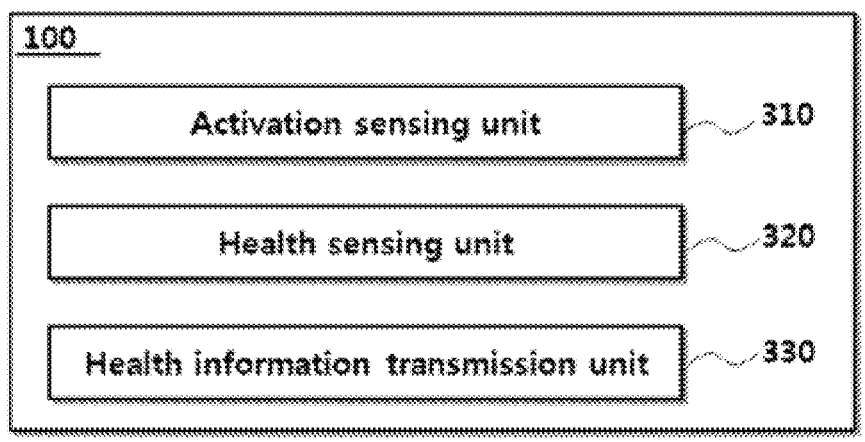
FIGS. 3A and 3B are block diagrams illustrating the operation of the mobile communication terminal according to an embodiment of the present invention.
Figure 3B:
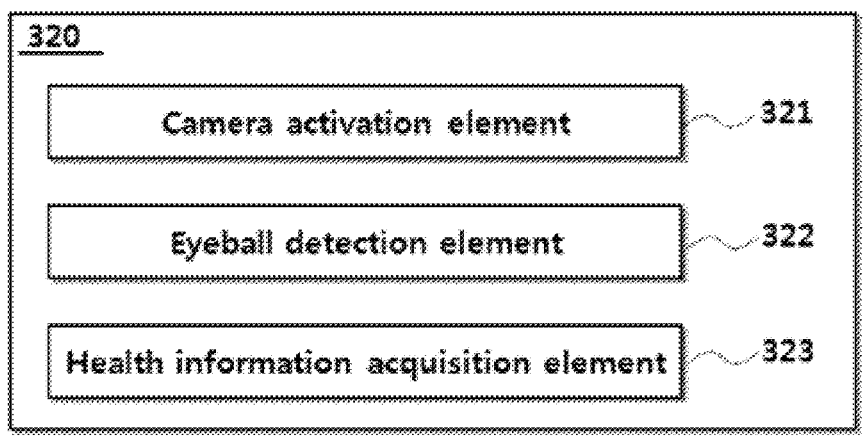

FIGS. 3A and 3B are block diagrams of the mobile communication terminal 100 illustrating the above-described functions. FIGS. 3A and 3B illustrate functional block diagrams illustrating the above-described functions of the mobile communication terminal 100.

Referring to FIG. 3A, the mobile communication terminal 100 can include an activation sensing unit 310, a health sensing unit 320, and a health information transmission unit 330.

When the mobile communication terminal 100 is in the inactive state, the activation sensing unit 310 senses whether or not the user has pressed the activation button 120.

The health sensing unit 320 is operated when the activation sensing unit 310 has sensed that the activation button 120 has been pressed, and senses a health state of the user in various methods.

FIG. 3B is a block diagram illustrating an example of the health sensing unit 320. Referring to FIG. 3B, the health sensing unit 320 can include a camera activation element 321, an eyeball detection element 322, and a health information acquisition element 323.

The camera activation element 321 activates the camera 130 provided in the mobile communication terminal 100. According to the activation of the camera 130, a video currently captured by the camera 130 is displayed on the display unit 110. If an eye or face of the user is imaged by the camera 130, the eyeball detection element 322 performs a function of recognizing and extracting an eyeball of the user. A general eyeball detection algorithm can be used for eyeball detection. The health information acquisition element 323 acquires various health information through the eyeball detected through the eyeball detection element 322. It is possible to recognize a stress index, a diabetes index, or retinal diseases of the user through a color or health state of the eyeball. A well-known algorithm in the related art can be used as an algorithm for detecting health information from characteristics of the detected eyeball.

The health information acquired as described above can be transmitted by the health information transmission unit 330 to the mobile communication terminal of a protector, a medical authority such as a doctor or the like, or a predetermined server. Information regarding the protector (for example, a phone number or an e-mail address) can be stored in advance. The acquired health information can be displayed on the display unit 110 so that the user can check the acquired health information.

The above-described operations, that is, the eyeball detection function and the health sensing function based on information regarding the detected eyeball, can be performed by installing a predetermined application. That is, the application includes an eyeball detection algorithm and a health sensing algorithm, so that the operations as described above can be performed by installing the application in the mobile communication terminal 100. The user can download this application and install the downloaded application in the mobile communication terminal 100. In addition, although an example of only health sensing through eyeball detection has been described above, it is possible to install an application, for example, for health sensing through face detection, and connect the application to the activation button 120. The user can use the functions as described above by setting the application to be operated immediately when the activation button 120 is pressed through the setting menu in the inactive state of the mobile communication terminal 100.

In general, aged persons may not use the health sensing function due to a difficult operation even when the health sensing function is provided in the mobile communication terminal 100. However, according to the above-described embodiment of the present invention, the health sensing function is operated only by pressing the activation button 120 without a special operation. Accordingly, it is possible to easily check health information and transmit the health information to a protector or a doctor.

3. User Identification Function

When the mobile communication terminal 100 is in the inactive state, a user authentication process can be performed for security by pressing the activation button 120.

Figure 4A:
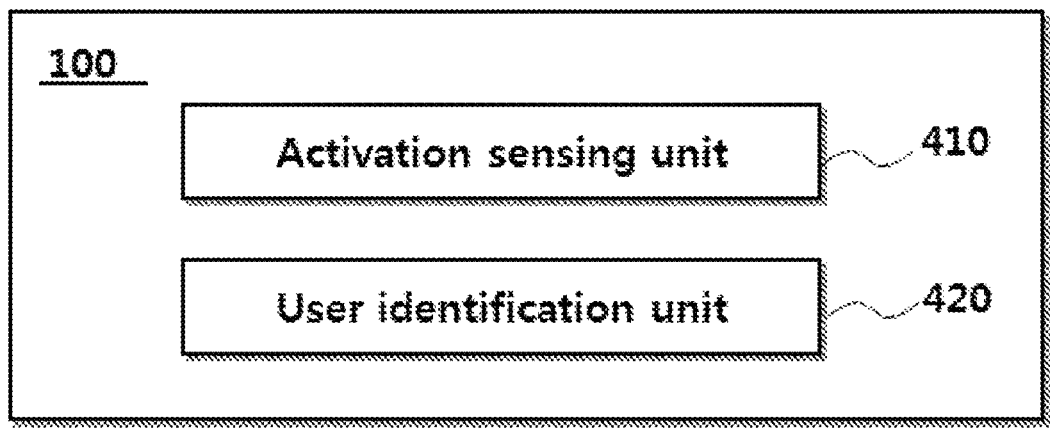
FIGS. 4A and 4B are block diagrams illustrating the operation of the mobile communication terminal according to another embodiment of the present invention.
Figure 4B:
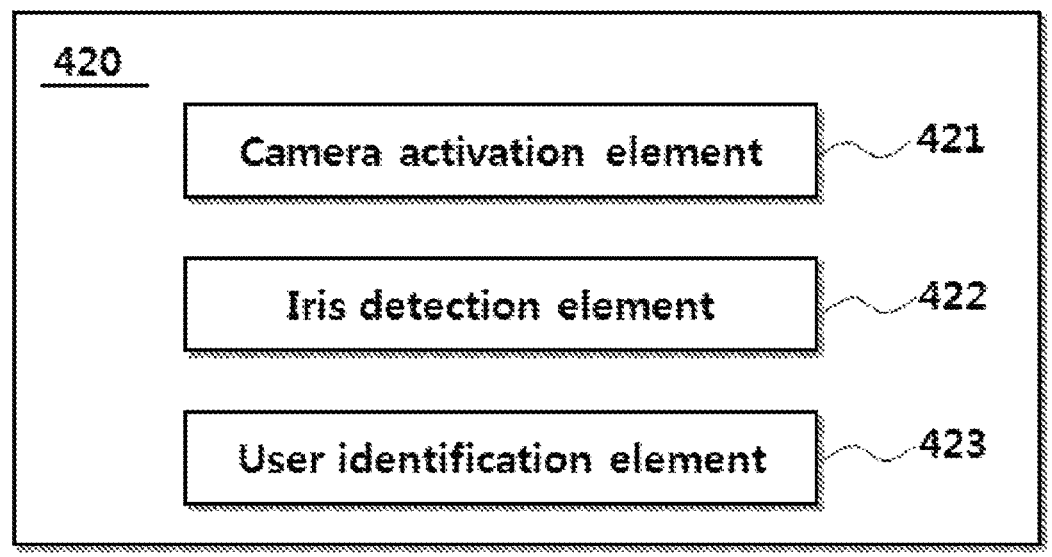

FIGS. 4A and 4B illustrate block diagrams of the mobile communication terminal 100 illustrating the above-described functions. Referring to FIG. 4A, the mobile communication terminal 100 can include an activation sensing unit 410 and a user identification unit 420.

When the mobile communication terminal 100 is in the inactive state, the activation sensing unit 410 senses whether or not the user has pressed the activation button 120.

If the activation sensing unit 410 senses that the activation button 120 has been pressed, the user identification unit 420 operates the user identification function in various methods.

FIG. 4B is a block diagram illustrating an example of the user identification unit 420. Referring to FIG. 4B, the user identification unit 420 can include a camera activation element 421, an iris detection element 422, and a user identification element 423.

The camera activation element 421 activates the camera 130 provided in the mobile communication terminal 100. According to the activation of the camera 130, a video currently captured by the camera 130 is displayed on the display unit 110. If an eye or face of the user is imaged by the camera 130, the iris detection element 422 performs a function of recognizing and extracting an iris from an eyeball of the user. A general iris detection algorithm can be used for iris recognition. The user identification element 423 performs a function of comparing the iris detected by the iris detection element 422 to pre-stored iris information of the user, and authenticating the current user as a true user if the two match. For this, the user identification element 423 can use iris information of the user pre-stored in a database (not illustrated). The iris information of the user can be stored by registering information regarding the iris detected by the iris detection element 422 using a video of the true user first captured by the camera 130. Predetermined identification information (for example, an identifier (ID), a password, a social security number, or the like) should be input to change the registered iris information of the true user. If the user identification element 423 authenticates the current user as the true user, the lock state of the mobile communication terminal 100 is released and all functions are available. If the current user is not authenticated as the true user, the lock state continues along with a display of an alarm message.

The above-described operations, that is, the iris detection function, the user identification function, and the user authentication function, can be performed by installing a predetermined application. That is, the application includes the iris detection algorithm and the authentication algorithm based on an iris comparison, so that the operations as described above can be performed by installing the application in the mobile communication terminal 100. The user can download this application and install the downloaded application in the mobile communication terminal 100. The user can use the functions as described above by setting the application to be operated immediately when the activation button 120 is pressed through the setting menu in the inactive state of the mobile communication terminal 100.

Accordingly, it is possible to efficiently reduce security risks by setting the user authentication process to be performed through a separate setting, that is, by pressing the activation button 120, when the mobile communication terminal 100 is used in a region vulnerable to the security risks.

Although an example of an authentication method through iris recognition has been described above, other authentication methods, for example, an authentication key matching method, a password matching method, a face recognition method, a fingerprint recognition method, and the like, can be used. That is, one or more authentication methods can be performed by pressing the activation button 120.

4. Location Information Transmission Function

When the mobile communication terminal 100 is in the inactive state, collected location information can be transmitted to a protector or a protection authority (a police station or a fire station) by pressing the activation button 120.

Figure 5:
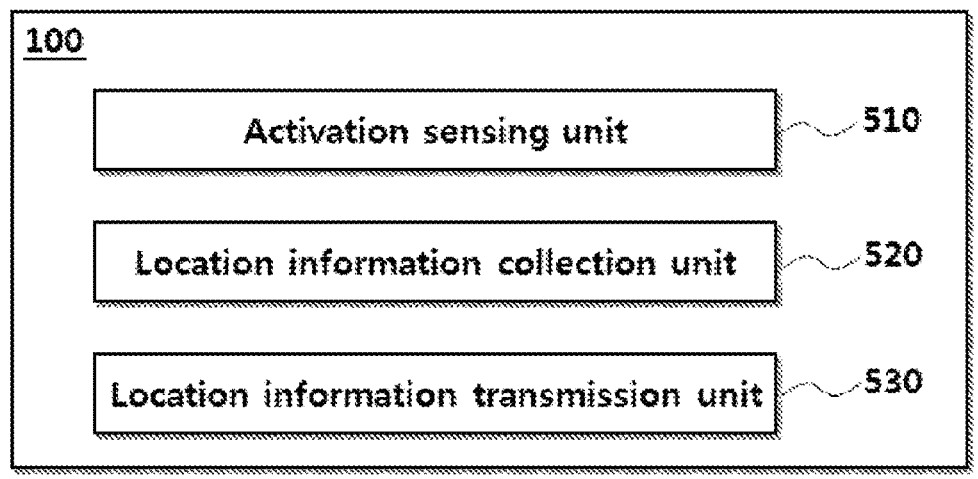
FIG. 5 is a block diagram illustrating the operation of the mobile communication terminal according to still another embodiment of the present invention.

FIG. 5 illustrates a block diagram of the mobile communication terminal 100 illustrating the above-described function. Referring to FIG. 5, the mobile communication terminal 100 can include an activation sensing unit 510, a location information collection unit 520, and a location information transmission unit 530.

When the mobile communication terminal 100 is in the inactive state, the activation sensing unit 510 senses whether or not the user has pressed the activation button 120.

When the activation sensing unit 510 senses that the activation button 120 has been pressed, the location information collection unit 520 collects a current location using a global positioning system (GPS) sensor or other location sensors.

The location information transmission unit 530 performs a function of transmitting location information collected by the location information collection unit 520 to a protector or a protection authority. In an urgent situation, a message indicating the urgent situation can be transmitted along with the location information. The location information and the urgent message can be optionally transmitted. On the other hand, this operation may differ according to the number of presses or a press time of the activation button 120. For example, it is possible to set an operation of transmitting the urgent message to a police station along with the location information when the activation button 120 is pressed for a short time, and set an operation of transmitting only the location information to the protector when the activation button 120 is pressed for a long time. In addition, as another example, it is possible to set an operation of transmitting the location information to the police station along with the urgent message when the activation button 120 is pressed once and set an operation of transmitting the location information to a fire station along with the urgent message when the activation button 120 is pressed three times.

The above-described operations can be performed by installing a predetermined application. That is, the application includes an algorithm for collecting location information and transmitting the collected located information along with an urgent message, so that the operations as described above can be performed by installing the application in the mobile communication terminal 100. The user can download this application and install the downloaded application in the mobile communication terminal 100. The user can use the functions as described above by setting the application to be operated immediately when the activation button 120 is pressed through the setting menu in the inactive state of the mobile communication terminal 100.

Accordingly, it is possible to efficiently escape a dangerous situation because the user can report the dangerous situation to a protector or a protection authority along with his/her location information with only a simple operation.

5. File Transmission Function

When the mobile communication terminal 100 is in the inactive state, a function of uploading content (for example, contact information, a photo, a moving image, or an application) included in the mobile communication terminal 100 to another mobile communication terminal 100 or a media space (for example, a personal media space such as Twitter, Facebook, or a blog or a community media space such as a café or club community) can be operated.

6. Mode Change During Drive

When the mobile communication terminal 100 is in the inactive state, the mobile communication terminal 100 can be switched to a hands-free function or some communication functions (a voice communication function, a short message service (SMS) function, and an Internet function) of the mobile communication terminal 100 can be interrupted by pressing the activation button 120.

Accordingly, it is possible to significantly reduce traffic accident risks by switching the mode of the mobile communication terminal 100 or interrupting the communication function with only a simple operation of pressing the activation button 120 during driving.

7. Advertisement Display Operation

When the mobile communication terminal 100 is in the inactive state, the activation button 120 is pressed so that an advertisement can be displayed on at least a part of the display unit 110. The advertisement display can be implemented by displaying an advertisement provided from an external server in real time, and driven by an advertisement-related application previously installed within the mobile communication terminal 100.

This application for enabling the advertisement to be displayed may be received in advance from an advertisement distribution server, an advertiser server, or a server for providing a service according to an embodiment of the present invention, that is, a service for driving a predetermined application according to a button input that switches the mobile communication terminal 100 from the inactive state to the active state.

An advertisement display method can be implemented by a method of randomly displaying advertisements of advertisers joining this service, a customized advertisement display method based on user information, and an advertisement display method based on a current location.

The user information can be pre-stored in a corresponding application and pre-transmitted to a server that provides an advertising service. On the other hand, location information collection necessary for the advertisement display method based on the current location can be used in conjunction with 4. Location Information Function described above. That is, current location information is collected simultaneously with the activation of the mobile communication terminal 100 and transmitted to an advertising-service providing server. Based on the current location information, advertisements related to the current location are distributed to the mobile communication terminal 100.

8. Other Application Operations

If a predetermined operation is performed in addition to switching to a simple active state by pressing the activation button 120 when the mobile communication terminal 100 is in the inactive state, this belongs to the scope of the present invention.

For example, an entertainment operation (for example, an operation of a music or video player, execution of a game application, or news reception) can be performed by pressing the activation button 120.

Operation Standby of Application

According to an embodiment of the present invention, the above-described predetermined applications are driven when the mobile communication terminal 100 is switched from the inactive state to the active state.

For this, when the mobile communication terminal 100 is in the inactive state, the applications should be maintained in an operation standby state. When the mobile communication terminal 100 is switched from the active state to the inactive state, the above-described applications can be in the operation standby state. That is, a selected application to be driven when the mobile communication terminal 100 is switched to the active state can be in the operation standby state when the mobile communication terminal 100 is switched to the inactive state.

However, a predetermined application operable when the mobile communication terminal 100 is switched from the inactive state to the active state regardless of the operation standby state or an operation disable state of the application belongs to the present invention.

Service Providing Server

Hereinafter, the service providing server according to an embodiment will be described.

Figure 6:
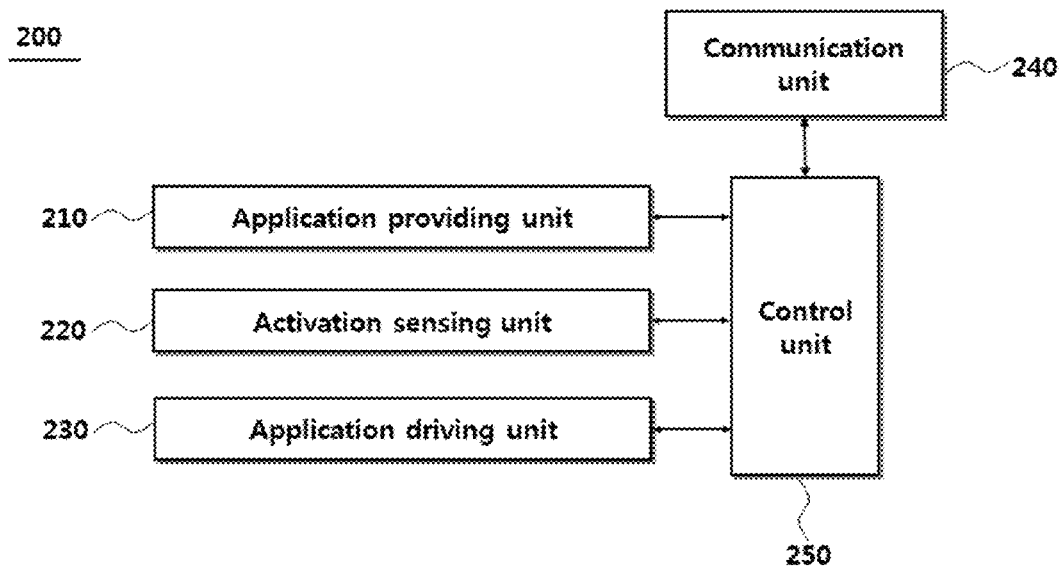
FIG. 6 is a diagram illustrating a configuration of a service providing system (server) for enabling a specific function to be operated when the mobile communication terminal is activated according to an embodiment of the present invention.

FIG. 6 is a diagram illustrating a configuration of a service providing system (server) for enabling a specific function to be operated when the mobile communication terminal is activated according to an embodiment of the present invention.

Referring to FIG. 6, the service providing server 200 can include an application providing unit 210, an activation sensing unit 220, an application driving unit 230, a communication unit 240, and a control unit 250. According to an embodiment of the present invention, the application providing unit 210, the activation sensing unit 220, the application driving unit 230, the communication unit 240, and the control unit 250 of the service providing server 200 can be program modules or hardware communicable with an external apparatus. The program modules or hardware can be included in the service providing server 200 or another apparatus communicable with the service providing server 200 in the form of an operation system, an application program module, and other program modules, and physically stored in various known storage apparatuses. On the other hand, these program modules or hardware include a routine, a sub routine, a program, an object, a component, and a data structure, each of which executes a specific task to be described later or specific abstract data, but the present invention is not limited thereto.

The application providing unit 210 enables the predetermined application described above to be transmitted to the mobile communication terminal 100. The user can receive a desired application by accessing the service providing server 200 through the mobile communication terminal 100, and install the received application within the mobile communication terminal 100. The application can include a control function of controlling a predetermined operation to be performed when the mobile communication terminal 100 is activated, and can independently perform the predetermined operation. For example, the application transmitted from the application providing unit 210 can be an application for enabling an advertisement to be displayed on the display unit 110 when the mobile communication terminal 100 is switched from the inactive state to the active state.

The activation sensing unit 220 according to an embodiment can sense the switching of the mobile communication terminal 100 from the inactive state to the active state. The user can transmit a signal indicating the activation of the mobile communication terminal 100 to the service providing server 200 by pressing the activation button of the mobile communication terminal 100.

The application driving unit 230 according to an embodiment enables a predetermined operation to be performed in the mobile communication terminal 100 when the activation of the mobile communication terminal 100 is sensed. That is, the application driving unit 230 drives a predetermined application within the mobile communication terminal 100 and enables a related screen to be displayed on the display unit 110. For example, if the activation of the mobile communication terminal 100 is sensed, an advertisement-related application can be executed. The application driving unit 230 can perform an additional operation related to driving of a corresponding application. For example, an application for enabling an advertisement to be displayed is driven to receive current location information and control advertisement information related to a corresponding location to be displayed on the display unit 110 of the mobile communication terminal 100. In addition, it is possible to collect user information (for example, a sex, an age, a region of residence, a matter of interest, and the like) and control advertisement information customized for a corresponding user to be displayed. Necessary advertisement information (for example, advertisement information to be transmitted to the mobile communication terminal 100 based on location information or user information) can be transmitted from an advertiser server or an advertisement distribution server. As described above, the application driving unit 230 can drive a predetermined application simultaneously with the activation within the mobile communication terminal 100 and perform an additional operation for optimally driving the application.

The communication unit 240 according to an embodiment makes information communication between the service providing server 200, the mobile communication terminal 100, and another apparatus possible. That is, the communication unit 240 can transmit an application to the mobile communication terminal 100 and receive an activation signal and information for driving the application from the mobile communication terminal 100.

The control unit 250 according to an embodiment can perform a function of controlling data flows between the application providing unit 210, the activation sensing unit 220, the application driving unit 230, and the communication unit 240. That is, the control unit 250 according to the embodiment can control the application providing unit 210, the activation sensing unit 220, the application driving unit 230, and the communication unit 240 to perform unique functions.

According to embodiments of the present invention, it is possible to enable an advantageous function to be utilized and improve an interest of a terminal user because various operations can be performed only by pressing an activation button when a terminal is in an inactive state.

According to embodiments of the present invention, it is possible to enable health check of an aged person to be performed with a simple operation and enable information regarding the health check to be transmitted to a protector or a medical authority.

According to embodiments of the present invention, it is possible to enable a user authentication process of which the security is enhanced to be operable with only a simple procedure.

According to embodiments of the present invention, it is possible to enable an urgent message to be transmitted along with location information with only a simple operation in an urgent situation.

The embodiments according to the present invention described above may be implemented in the form of program instructions that may be executed through various computer components and recorded on a computer-readable medium. The computer-readable medium may include program instructions, data files, data structures, and the like individually or in combination. The program instructions recorded on the medium may be specifically designed for the present invention or may be well known to one of ordinary skill in the art of software. Examples of the computer-readable recording medium include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as ROM, a random access memory (RAM), or a flash memory that is specially designed to store and execute program instructions. Examples of the program instructions include not only machine code generated by a compiler or the like but also high-level language codes that may be executed by a computer using an interpreter or the like. The hardware device described above may be constructed so as to operate as one or more software modules for performing the operations of the embodiments of the present invention, and vice versa.

Although the present invention has been described with reference to the specific embodiments and drawings together with specific details such as detailed components, the above description is provided only for better understanding of the present invention and it will be apparent to those skilled in the art that various modifications and variations may be made from the above description.

While embodiments have been disclosed herein, it should be understood that other variations may be possible. Such variations are not to be regarded as a departure from the spirit and scope of embodiments of the present application, and all such modifications as would be obvious to one skilled in the art are intended to be included within the scope of the following claims.

What is claimed is:

1. A mobile communication terminal comprising:
   a touch screen display;
   a camera;
   a power button configured to turn on and off the terminal by pressing; and
   an activation button separate from the power button and located outside the touch screen display, the activation button configured for pressing to turn on the touch screen display and to initiate one or more additional functions of the terminal,
   wherein the terminal has a first function and a second function to perform in response to user input via the activation button and is configured to provide user settings for configuring at least one of the first and second functions such that at least one of the first and second functions is set to be performed in addition to turning on the touch screen display upon pressing of the activation button while the touch screen display is turned off, wherein the first and second functions are different from each other and selected from the group consisting of fingerprint authentication, activating the camera, and an operation that involves playing a sound,
wherein upon one-time pressing of the activation button while the touch screen display is turned off, the terminal is configured to turn on the touch screen display and further perform at least one of the first and second functions in addition to turning on the touch screen display such that:
 a lock screen is displayed on the touch screen display upon turning on the touch screen display in response to the one-time pressing of the activation button while the touch screen display is turned off,
 in response to the one-time pressing of the activation button, the first function is performed in addition to turning on the touch screen display for displaying the lock screen thereon, and
 the second function is performed when the one-time pressing is for long time longer than a reference time period,
 wherein at least one of the first and second functions is performed subsequent to turning on the touch screen display and displaying the lock screen in response to the one-time pressing of the activation button,
 wherein the touch screen display displays the lock screen when at least one of the first and second functions is being performed.

2. The terminal of claim 1, wherein the first function is the fingerprint authentication.

3. The terminal of claim 2, wherein upon one-time pressing of the activation button for long time while the touch screen display is turned off, the terminal is configured to turn on the touch screen display for displaying the lock screen and further configured to display the lock screen when the second function is being performed.

4. The terminal of claim 1, wherein one of the first and second functions comprises the fingerprint authentication, wherein the terminal is configured to turn on the touch screen display for displaying the lock screen and further configured to display the lock screen when the fingerprint authentication is being performed in response to the one-time pressing of the activation button while the touch screen display is turned off.

5. The terminal of claim 4, wherein the terminal is configured to continue its lock state when the fingerprint authentication fails to authenticate a user, whereas the terminal is configured to release the lock state and make its other functions available when the fingerprint authentication authenticates a user.

6. The terminal of claim 5, wherein the terminal is configured to display a message on the touch screen display when the lock state continues due to failure of user authentication by the fingerprint authentication.

7. The terminal of claim 1, wherein at least one of the first and second functions is associated with software downloadable by the terminal.

8. The terminal of claim 1, wherein the terminal is configured to have a mobile application stay in a standby state when the touch screen display is turned off while the mobile application is running, wherein in response to the one-time pressing of the activation button while the touch screen display is turned off, the terminal is configured to perform at least one of the first and second functions regardless of whether at least one of the first and second functions is in its standby state or an operation disable state.

9. The terminal of claim 1, wherein upon repeated pressing of the activation button while the touch screen display is turned off, the terminal is configured to turn on the touch screen display and further perform a third function other than the first and second functions in addition to turning on the touch screen display.

10. The terminal of claim 1, wherein the terminal comprises a smartphone which comprises an activation sensor configured to detect pressing of the activation button and a user identification module configured to perform the fingerprint authentication.

11. A method of operating a mobile computing terminal, the method comprises:
 providing a mobile computing terminal which comprises a touch screen display, a camera, a power button for pressing to turn on/off the terminal, and an activation button for pressing to turn on the touch screen display, the activation button located outside the touch screen display, the terminal having a first function and a second function that are different from each other and selected from the group consisting of fingerprint authentication, activating the camera, and an operation that involves playing a sound;
 detecting one-time pressing of the activation button while the terminal is in an inactive state in which the touch screen display is turned off;
 in response to the one-time pressing, changing the terminal from the inactive state to an active state in which the touch screen display is turned on; and
 in addition to changing to the active state, further performing at least one of the first and second functions without additional user input other than the one-time pressing;
 wherein in changing to the active state and performing at least one of the first and second functions, the terminal operates such that:
  a lock screen is displayed on the touch screen display upon changing from the inactive state to the active state in response to the one-time pressing of the activation button while the touch screen display is turned off,
  in response to the one-time pressing of the activation button, the first function is performed in addition to changing to the active state for displaying the lock screen, and
  the second function is performed when the one-time pressing is for long time longer than a reference time period,
  wherein at least one of the first and second functions is initiated subsequent to changing to the active state and displaying the lock screen in response to the one-time pressing of the activation button,
  wherein the touch screen display displays the lock screen when at least one of the first and second functions is being performed.

12. The method of claim 11, further comprising:
 receiving user input on a setting menu of the terminal; and
 configuring, based on the user input, settings of the terminal such that the at least one of the first and second functions is set to be performed in addition to changing to the active state upon one-time pressing of the activation button while the terminal is in its inactive state.

13. The method of claim 11, wherein the at least one of first and second functions comprises the fingerprint authentication, in which the lock screen is displayed on the touch screen display when the fingerprint authentication is being performed, wherein in performing the fingerprint authentication, the terminal operates such that;
- a lock state of the terminal continues when the fingerprint authentication fails to authenticate a user, and
- the lock state is released for enabling other functions of the terminal when the fingerprint authentication authenticates a user.

14. The method of claim 13, wherein the touch screen display displays a message thereon when the lock state continues due to failure of user authentication by the fingerprint authentication.

15. The method of claim 11, wherein the at least one of the first and second functions is associated with software downloadable by the terminal.

16. The method of claim 11, wherein the terminal is configured to have a mobile application stay in a standby state when the touch screen display is turned off while the mobile application is running, wherein in response to the one-time pressing of the activation button while the terminal is in its inactive state, the terminal performs the at least one of the first and second functions regardless of whether the at least one of the first and second functions is in its standby state or an operation disable state.

17. The method of claim 11, further comprising:
detecting repeated pressing of the activation button while the terminal is in its inactive state;
in response to the repeated pressing, changing the terminal from the inactive state to the active state; and
in addition to changing to the active state, further performing a third function other than the first and second functions without additional user input;
wherein in changing to the active state and performing the at least one of the first and second functions, the terminal operates such that:
- the touch screen display displays the lock screen thereon as the terminal changes to the active state in response to the repeated pressing,
- the lock screen is displayed on the touch screen display when the third function is being performed.

18. The method of claim 11, wherein the terminal comprises a smartphone which comprises an activation sensor configured to detect pressing of the activation button and a user identification module configured to perform the fingerprint authentication.

* * * * *

UNITED STATES PATENT AND TRADEMARK OFFICE
CERTIFICATE OF CORRECTION

PATENT NO. : 9,633,373 B2  Page 1 of 1
APPLICATION NO. : 14/848156
DATED : April 25, 2017
INVENTOR(S) : Jae Lark Jung et al.

It is certified that error appears in the above-identified patent and that said Letters Patent is hereby corrected as shown below:

In the Specification

In Column 1 at Line 37 (approx.), Change "that is" to --that is,--.

In Column 1 at Line 57, Change "unit" to --unit;--.

In Column 2 at Line 11, Change "termini" to --terminal--.

In Column 3 at Line 52, Change "camera." to --camera--.

In the Claims

In Column 13 at Line 6, In Claim 1, change "and an operation that involves playing a sound," to --playing music and a hands-free function,--.

In Column 14 at Lines 24-25, In Claim 11, change "and an operation that involves playing a sound;" to --playing music and a hands-free function;--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*